United States Patent [19]

Piccolo et al.

[11] 4,071,347

[45] Jan. 31, 1978

[54] NOVEL COMPOSITION FOR USE IN AGRICULTURE AS SOIL IMPROVERS AND FERTILIZERS AND PROCESS FOR THEIR PRODUCTION

[75] Inventors: Luigi Piccolo; Benedetto Calcagno, both of Milan; Marcello Ghirga, Bresso (Milan); Antonio Paolinelli, Milan, all of Italy

[73] Assignee: Societa' Italiana Resine S.I.R. S.p.A., Milan, Italy

[21] Appl. No.: 631,275

[22] Filed: Nov. 12, 1975

Related U.S. Application Data

[63] Continuation of Ser. No. 449,576, March 8, 1974, abandoned.

[30] Foreign Application Priority Data

Mar. 8, 1973 Italy ............................... 21320/73

[51] Int. Cl.² ............................................. C05D 9/02
[52] U.S. Cl. .................................... 71/31; 71/63; 71/64 SC; 423/548; 423/632
[58] Field of Search .................. 71/1, 25, 31, 40, 51, 71/53, 61, 63, 64 A, 64 R, 64 SC; 423/548, 632

[56] References Cited

U.S. PATENT DOCUMENTS

| 2,374,454 | 4/1945 | Oliver | 423/632 X |
| 2,741,876 | 4/1956 | Paolini | 71/63 X |

*Primary Examiner*—Charles N. Hart
*Assistant Examiner*—Ferris H. Lander
*Attorney, Agent, or Firm*—Sughrue, Rothwell, Mion, Zinn and Macpeak

[57] ABSTRACT

Novel compositions for use in agriculture as soil improvers and fertilizers comprising as essential components ammonium sulfate and ferric oxide hydrate. By-products obtained in the production of titanium dioxide from ilmenite or ilmenite slag in the sulfate process and substantially consisting of ferrous sulfate heptahydrate are reacted with ammonia and that the reaction product obtained, consisting substantially of ammonium sulfate and ferrous hydrate, is subsequently oxidized until a composition is obtained which substantially consists of ammonium sulfate and ferric oxide hydrate.

9 Claims, No Drawings

NOVEL COMPOSITION FOR USE IN AGRICULTURE AS SOIL IMPROVERS AND FERTILIZERS AND PROCESS FOR THEIR PRODUCTION

This is a Continuation of application Ser. No. 449,576, filed Mar. 8, 1974, and now abandoned.

The invention relates to novel compositions for use in agriculture as soil improvers and fertilizers as well as to a process for their production.

The invention relates in particular to novel compositions for use in agriculture as soil improvers and fertilizers which are prepared from the by-products obtained in the production of titanium dioxide from ilmenite or ilmenite slag in the sulfate process and substantially consist of ferrous sulfate heptahydrate.

Since there are only a few areas where such by-products can be put to practical use, also due to their high impurity contents, and since their disposal causes considerable pollution as their reducing properties, their toxicity and the large amounts involved lead to considerable environmental changes, the problem of how to convert these substances to products devoid of the aforementioned drawbacks has become ever more pressing.

Obviously, a preferred solution to the problem consists in that the by-products obtained in the production of titanium dioxide are converted into an advantageously utilizable material.

Processes for converting ferrous sulfate by-products obtained in the production of titanium dioxide from ilmenite or ilmenite slag in the sulfate process into utilizable substances are the subjects of earlier patents of Applicant (Italian Pat. Nos. 857,062; 880,264; 913,054).

It has now been found that ferrous sulfate obtained as by-product in the production of titanium dioxide from ilmenite or ilmenite slag in the sulfate process can be converted into a useful product which due to its composition can be advantageously used in agriculture as soil improver and fertilizer.

An object of this invention therefore is to provide a process for converting ferrous sulfate obtained as by-product in the production of titanium dioxide from ilmenite or ilmenite slag in the sulfate process into a useful product.

Another object of this invention is to provide a process for preparing compositions to be used in agriculture as soil improvers and fertilizers from ferrous sulfate obtained as by-product in the production of titanium dioxide from ilmenite or ilmenite slag in the sulfate process.

Yet another object of this invention is to provide a simple and useful process for preparing compositions to be used in agriculture as soil improvers and fertilizers.

Another object of this invention is to provide compositions for use in agriculture as soil improvers and fertilizers comprising as essential components ammonium sulfate and ferric oxide hydrate.

In accordance with this invention a process is provided which is characterized in that by-products obtained in the prodcution of titanium dioxide from ilmenite or ilmenite slag in the sulfate process and substantially consisting of ferrous sulfate heptahydrate are reacted with ammonia and that the reaction product obtained, consisting substantially of ammonium sulfate and ferrous hydrate, is subsequently oxidized until a composition is obtained which substantially consists of ammonium sulfate and ferric oxide hydrate.

The reaction with ammonia and the oxidation step may also be carried out in a single step.

The reaction of ferrous sulfate with ammonia is carried out at a temperature normally ranging between room temperature (20°–25° C) and the melting temperature of ferrous sulfate heptahydrate (about 64° C). Within this range the reaction is instantaneous and quantitative.

The reaction is advantageously effected in the dry state by contacting gaseous ammonia with the aforementioned dry product which substantially consists of ferrous sulfate.

Effecting the reaction in the dry state involves numerous advantages since the processing of large amounts of liquid as well as process steps such as crystallization, filtration and drying can be avoided.

During the oxidation step ferrous hydrate obtained together with ammonium sulfate in the reaction of ferrous sulfate with ammonia is converted to ferric oxide hydrate. The oxidation is readily effected at low temperatures, preferably in the range of 20° to 60° C, by treatment with oxygen or a gas containing molecular oxygen.

When effecting the oxidation in a single step immediately after the reaction with ammonia the temperature may also rise to 80° C but exceeding this limit is not recommended. It has been found that when this limit is exceeded both in the reaction of ferrous sulfate with ammonia and during oxidation the final product suffers a serious loss in soil improving properties.

Several methods may be applied by those skilled in the art for carrying out the inventive process.

The process step in which reaction with ammonia takes place may for instance be effected in a vertical reactor according to the fluidized bed technique or the moving bed technique. A horizontal rotary reactor may also be used into which ammonia is introduced in a countercurrent to ferrous sulfate.

The reaction with ammonia may also be carried out by keeping the ferrous sulfate in the molten state. In this embodiment a technique may be applied which provides for spraying the molten ferrous sulfate into a reactor into which an equivalent amount of ammonia is introduced.

Oxidation may be effected by similar techniques, also simultaneously with the reaction of ferrous sulfate with ammonia.

According to one embodiment of this invention oxidation is effected separately from the reaction with ammonia, merely by subjecting the material to the influence of ambient air. The material is arranged in a layer of limited thickness to ensure a good contact with the air.

In order to enhance the soil improving properties of the inventive compositions the oxidation product consisting substantially of ammonium sulfate and ferric oxide hydrate may additionally be treated with sulfuric acid whereby ferric oxide hydrate is partly or completely converted to ferric sulfate.

This reaction, which is practically quantitative, is effected at room temperature (20°–25° C).

Generally sulfuric acid is used in amounts leading to a conversion of ferric oxide hydrate to ferric sulfate to an amount of at least 5 mole percent, preferably between 20 and 75 mole percent.

This last process step can be easily effected by spraying highly concentrated sulfuric acid, for instance 98% commercial sulfuric acid, on the oxidation product.

The inventive compositions obtained irrespective of whether the production process is carried out in two separate steps or in one combined step are obtained in the form of reddish brown powder. When the production process includes the additional treatment with sulfuric acid a powder of dark-violet color is obtained. The inventive compositions may not only be used as fertilizers but also for improving compact soils, especially alkaline clay soils. These rather wide-spread soils which are little suited for cultivation are such that the arrangement of the soil particles hardly perimts the penetration of air and water. Under these conditions plant life and vegetation in general can hardly subsist, sometimes not at all.

Moreover, these soils are subject to leaching and erosion by atmospheric precipitations.

It is already known in the art that these compact soils, especially clay soils, may be improved and transformed into cultivatable areas by incorporating ferrous salts.

These salts cause the clay particles to agglomerate to granules which give the soil a granular porous texture. This texture involves a considerably enhanced permeability and aeration of the soil because water and air can easily penetrate into the free spaces between the individual granules of the soil. This is highly advantageous for cultivation.

A porous granular texture almost completely eliminates the danger of leaching and erosion.

The direct use of ferrous salts in agriculture is, however, expensive so that normally numerous measures are taken in practical embodiments to reduce the amounts required.

The invention now provides for the first time an economically favorable process for producing compositions on the basis of iron compounds which can be directly used in agriculture.

The outstanding feature of the inventive process is that an undesired by-product is converted to a useful product.

The inventive compositions are not only effective fertilizers due to the presence of ammonium salts and have soil improving properties, they also have an antichlorotic effect.

Chlorosis is a plant disease caused by iron deficiency.

Even if it has not been determined beyond any doubt whether iron is absorbed by the plants in its divalent or in its trivalent form, it is a wide-spread opinion that iron is absorbed in the form of ferrous ions.

By applying the inventive compositions to alkaline clay soils carrying plants affected by chlorosis it was easily possible to eliminate this disease.

Without establishing any theory about chlorosis the anti-chlorotic effect of the inventive compositions could be explained by the small amounts (0.1 to about 2 percent by weight) of divalent iron present in these compositions, since considering the pH values of the alkaline clay soils iron is only soluble and can thus be assimilated by the plants in its divalent form.

The novel compositions and the inventive process for preparing them are illustrated by the following examples, without thereby limiting in any way the scope of the invention.

EXAMPLE 1

200 g ferrous sulfate obtained as by-product in the production of titanium dioxide from ilmenite were fed to a horizontal tube rotating at 60 R/min, having a diameter of 50 mm and a length of 1,000 mm, equipped internally with a comminuting and mixing device which rotates in a direction contrary to the movement of the tube.

The ferrous sulfate used had the following chemical composition: $FeSO_4 \cdot 7 H_2O$ = 88.6%; $MgSO_4 \cdot 7 H_2O$ = 6.8%; $Al_2(SO_4)_3 \cdot 18 H_2O$ = 0.8%; $MnSO_4 \cdot 5 H_2O$ = 0.56%; $CaSO_4 \cdot 2 H_2O$ = 0.26%; $TiOSO_4$ = 0.18%; sulfates of chromium, vanadium, zirconium, hafnium and rare earths = 0.01%; free sulfuric acid = 0.09%; $H_2O$ = 2.7%. The particle size was substantially in the range of 0.5 to 5 mm, some granules having a size of 3 to 4 mm.

Subsequently gaseous ammonia was introduced into the tube containing ferrous sulfate for one hour at a rate of 100 Nl/h and the reaction was carried out at a temperature of between 30° and 40° C.

The product thus obtained, which mainly consisted of ammonium sulfate and ferrous sulfate, was then subjected to oxidation in the same tube. For this purpose air was introduced into the tube for one hour at a rate of 100 Nl/h and the reaction was carried out at a temperature of between 30° and 40° C. The product was obtained which mainly consisted of ammonium sulfate and ferric oxide hydrate in the form of a reddish brown powder having a particle size of substantially 0.5 to 1.5 mm, some granules having a size of 2 to 3 mm.

In another test carried out to determine the soil improving properties the activity of this product with respect to increasing the filtration rate of bentonite manufactured by Settimio Cinicola, type ULTRAGEL 300, was tested.

A sample of this bentonite was admixed with the above-described product in an amount of 5 percent by weight, based on the bentonite.

The mixture was moistened and allowed to stand for 50 hours. Subsequently a comparative test with the filtration rate of pure bentonite was carried out.

Bentonite admixed with the above-described product showed an increase in the filtration rate of about 150%.

The anti-chlorosis test was carried out in a greenhouse with a lettuce crop grown in a tube containing soil free of iron.

For the purpose indicated the product obtained as described above was applied to the soil in a ratio of 5 percent by weight.

A control test was carried out with a crop which had developed under the same conditions but on a soil containing only a corresponding amount of ammonium sulfate.

Plants grown on the soil to which the inventive product had been applied developed a dark-green color while plants grown on the control yellowed markedly.

A further test was carried out on a field of alkaline clay soil with a product having the above-stated properties but obtained in a pilot plant having a capacity of 10 kg/h. The product was placed 20 cm deep by plowing in an amount of 110 kg on a field of 1,000 m².

Barley and oats crops showed an increase of 73 and 97%, respectively, compared to crops grown on a soil of the same kind but containing corresponding amounts of ammonium sulfate only.

EXAMPLE 2

The product obtained in example 1 was treated with 98% sulfuric acid until a product was obtained which mainly consisted of ammonium sulfate and ferric sulfate and contained 0.3 percent by weight of ferrous sulfate.

The treatment was effected by spraying sulfuric acid on the oxidation product obtained in example 1 at room temperature (20°–25° C) and the mixture was allowed to stand for 30 hours.

This modified product was obtained in the form of a dark-violet powder.

The product was subjected as in example 1 to the laboratory test with bentonite.

Compared to pure bentonite, bentonite modified according to the invention showed an increase in the filtration rate of about 320%.

The anti-chlorosis test according to example 1 showed essentially the same results.

When placing the product 20 cm deep in a field of alkaline clay soil in an amount of 150 kg per 1,000 m² of soil, barley and oats crops showed an increase of 95 and 120%, respectively, compared to crops grown on a soil of the same type but containing corresponding amounts of ammonium sulate only.

EXAMPLE 3

The reaction product of example 1 was treated as in example 2 with 98% sulfuric acid in an amount as to convert 50% of ferric oxide hydrate into ferric sulfate.

A modified product in the form of a dark-violet powder was obtained.

This product was subjected as in example 1 to the laboratory test with bentonite; the increase in the filtration rate of modified bentonite was 310% compared to pure bentonite.

EXAMPLE 4

According to the method of example 1 a product was prepared which consisted mainly of ammonium sulfate and ferric oxide hydrate, with the exception that the reaction of ferrous sulfate with ammonia was carried out at a temperature of between 40° and 50° C.

A product was obtained which in appearance and properties practically resembled the product of example 1. The product was then subjected to the laboratory test with bentonite, as in example 1. The increase in the filtration rate of modified bentonite compared to pure bentonite was about 145%.

EXAMPLE 5

According to the method of example 1 a product was prepared which consisted mainly of ammonium sulfate and ferric oxide hydrate, with the exception that oxidation in the second process step was carried out at 80° C by heating the reaction tube from outside. A product in the form of a reddish brown powder was obtained, similar to the product of example 1. The product was subjected to the laboratory test with bentonite as in example 1. The filtration rate of modified bentonite increased by 120% compared to pure bentonite.

EXAMPLE 6 (COMPARATIVE EXAMPLE)

The same starting substances as in example 1 and the same process methods were used, with the exception that the oxidation was carried out at 100° C by heating the reaction tube from outside.

A product in the form of a powder was obtained which resembled in appearance the product of example 1.

The product thus obtained was subjected to the laboratory test with bentonite as in example 1. The filtration rate of modified bentonite compared to pure bentonite increased by 35%.

EXAMPLE 7

According to the method of example 1 a product was prepared which mainly consisted of ammonium sulfate and ferric oxide hydrate, with the exception that the reaction of ferrous sulfate with ammonia and the oxidation were carried out in a single process step, ammonia and air being shown simultaneously into the tube containing ferrous sulfate.

A product was obtained which essentially resembled in appearance and properties the product of example 1.

In a laboratory test for determining the soil improving properties, which was carried out as in example 1, the filtration rate of modified bentonite increased by 155% compared to pure bentonite.

EXAMPLE 8

According to the method of example 1 a product was prepared which consisted mainly of ammonium sulfate and ferric oxide hydrate, with the exception that oxidation was carried out by subjecting the product obtained in the reaction of ferrous sulfate with ammonia to the influence of air under ambient conditions in a layer of 2 to 4 mm thickness. After 4 hours the product obtained showed substantially the same properties as that of example 1.

In a laboratory test for determining the soil improving properties, which was carried out as in example 1, the filtration rate of modified bentonite increased by 160% compared to pure bentonite.

What we claim is:

1. A process for preparing soil improvers and fertilizers characterized in that the dry by-products obtained in the production of titanium dioxide from ilmenite or ilmenite slag in the sulfate process and which substantially consist of dry ferrous sulfate heptahydrate with minor amounts of the sulfates of magnesium, manganese, calcium, aluminum and titanium are reacted with gaseous ammonia and the reaction product obtained, consisting substantially of ammonium sulfate and ferrous hydrate, is then subsequently oxidized until a composition is obtained which substantially consists of ammonium sulfate and ferric oxide hydrate and then the product consisting substantially of ammonium sulfate and ferric oxide hydrate is treated with sulfuric acid until ferric oxide hydrate has been converted to ferric sulfate to an amount of at least 5 mole percent.

2. The process of claim 1, characterized in that the reaction of the by-products with ammonia is carried out at a temperature of about 20° to 64° C.

3. The process of claim 1, characterized in that the reaction of the by-products with ammonia is carried out in the dry state by contacting gaseous ammonia with the dry by-products.

4. The process of claim 1, characterized in that the oxidation is carried out in the presence of a gas having oxidizing properties at a temperature of from 20° to 80° C.

5. The process of claim 1, characterized in that the oxidation is carried out in the presence of a gas having oxidizing properties at a temperature of from 20° to 60° C.

6. The process of claim 1, characterized in that oxygen or a gas containing molecular oxygen is used as gas having oxidizing properties.

7. The process of claim 1, characterized in that oxidation is carried out by subjecting the reaction product of the first process step to ambient air in a layer of limited thickness allowing a good contact with the air.

8. The process of claim 1, characterized in that the reaction vessel is fed simultaneously with the by-products, ammonia and the gas having oxidizing properties at a temperature of between 20° and 64° C.

9. The process of claim 1 characterized in that 20 to 75 mole percent of the ferric oxide hydrate is converted to ferric sulfate.

* * * * *